United States Patent [19]

Oota et al.

[11] Patent Number: 4,601,201

[45] Date of Patent: Jul. 22, 1986

[54] LIQUID LEVEL AND QUANTITY MEASURING APPARATUS

[75] Inventors: Yasuto Oota; Makoto Shimizu, both of Tokyo, Japan

[73] Assignee: Tokyo Tatsuno Co., Ltd., Tokyo, Japan

[21] Appl. No.: 709,165

[22] Filed: Mar. 7, 1985

[30] Foreign Application Priority Data

Mar. 14, 1984 [JP] Japan ................................. 59-48491
Mar. 14, 1984 [JP] Japan ................................. 59-48492

[51] Int. Cl.$^4$ ........................ G01F 23/26; G01R 27/26
[52] U.S. Cl. ........................... 73/304 C; 340/870.16;
361/284; 364/509; 374/142
[58] Field of Search ................... 73/304 C; 361/284;
364/509; 340/620

[56] References Cited

U.S. PATENT DOCUMENTS

| | | | |
|---|---|---|---|
| 3,283,577 | 11/1966 | Schuck | 73/304 C |
| 3,824,460 | 7/1974 | Gustafson | 361/284 X |
| 3,950,653 | 4/1976 | Kirkpatrick | 361/284 X |
| 4,099,167 | 7/1978 | Pomerantz et al. | 340/620 |
| 4,142,415 | 3/1979 | Jung et al. | 73/304 C |
| 4,227,236 | 10/1980 | Kubler | 361/398 X |
| 4,349,882 | 9/1982 | Asmundsson et al. | 377/21 X |
| 4,350,040 | 9/1982 | Fasching et al. | 73/304 C |
| 4,368,639 | 1/1983 | Owens | 73/292 X |
| 4,416,153 | 11/1983 | Williams | 364/509 X |
| 4,437,162 | 3/1984 | Kato | 364/509 X |
| 4,485,673 | 12/1984 | Stern | 73/304 C |
| 4,510,551 | 4/1985 | Brainard, II | 361/398 |

Primary Examiner—Daniel M. Yasich
Attorney, Agent, or Firm—Jordan and Hamburg

[57] ABSTRACT

Apparatus for measuring level and quantity of fuel oil stored in a tank, which comprises a pair of electrodes, one being a number of segmented electrodes while the other is an elongated electrode to form a number of capacitors, a source for applying high frequency voltage to said electrodes one by one to generate electric signals, means for converting said signals to corresponding high frequency signals, means for computing height of said liquid level from frequencies of signals, and means for computing the fuel quantity. Said capacitor probe is prepared by fastening an elongated flexible substrate IS printed with said electrodes round a rigid bar S, covering the outer surface thereof with insulative material, and fitting a metallic tube. Said segmented electrodes are arranged lengthwise in two rows in zig-zagged and partly overlapped.

20 Claims, 8 Drawing Figures

FIG. 6

LIQUID LEVEL AND QUANTITY MEASURING APPARATUS

TECHNICAL FIELD OF THE INVENTION

The invention relates to an apparatus for measuring the level and quantity of a liquid such as a fuel oil and as occasion demands further water accumulated thereunder in the tank, and more particularly to an apparatus provided with a so-called capacitor probe having a number of segmented electrodes and an elongated electrode opposite to the segments so as to form a number of capacitors therebetween.

BACKGROUNDS AND PRIOR ART

Liquid such as gasoline stored in an underground tank of a fuel dispensing station is decreased at every dispensing of fuel and eventually by leaking, and increased by resupply made at various times. Liquid such as water is accumulated a little by little for a long time at the bottom of the tank beneath the fuel inevitably containing a very small amount of water, which must be drained when the water level is raised so as not to be mixed with the gasoline supplied to a vehicle.

Thus, the amount of such liquid must be correctly measured in order to confirm the resupplied fuel volume and the total amount of dispensed fuel, as well as for detecting eventual leaking of fuel and avoiding danger of dispensing water mixed with the fuel.

For that purpose an elongated capacitor probe has been widely used in gas stations, which utilizes the fact that water, gasoline or other fuel and gas comprising air and fuel vapor have respectively inherent differential dielectric constants. When detecting electric signals from a number of capacitors, it is possible to determine which segmented electrodes are exposed to water, gasoline and vapor, and consequently detect water level as well as gasoline level. It is also possible to calculate the amount thereof according to geometric principles with reference to the dimensions and configuration of the respective fuel tank. The apparatuses for measuring level and quantity of the liquids provided with such capacitor probe are disclosed in various printed materials, for instance U.S. Pat. Nos. 3,283,577 and 4,349,882.

In such a capacitor probe, the number of the segmented electrodes must be enlarged as far as possible in order to detect correct liquid levels for calculation of correct volumes. The inner electrodes must be formed by assemblying many annular metallic rings with insulating material inserted between every two adjacent rings and arranging wires in order to apply voltage to such many segmented electrodes one by one and collect electric signal respectively from such many electrodes, which inevitably makes the cost of such capacitor probe to be fairly high. In addition thereto, it is difficult for such probe to comply with various fuel tanks of various depths.

Such known capacitor probes have further disadvantages in that when the liquid level happens to lie just between two adjacent electrodes the level detection can not be made and it is not always easy to hold the distance between the inner electrode and the outer electrode to be constant along the considerably extended length of such probe for securing the correct detection of the liquid level.

Furthermore, the electric signals as parameters of electrostatic capacities or dielectric constants of water, gasoline and vapor existing between a number of segmented electrodes and the outer electrode surrounding the inner electrodes are of the nature to be readily attenuated so that correct analysis thereof in the position such as a station cabin remoted more or less from the capacitor probe is difficult for correct calculation of the quantity.

SUMMARY OF THE INVENTION

An object of the invention is, thus, to provide an apparatus for correctly detecting the level of a liquid stored in a tank by means of a capacitor probe to be readily assembled so as to conform with the respective depth of the tank and consequently of low cost and correctly calculating the volume thereof on the basis of supplied signals in the form of low attenuation.

Such object and other objects as well as advantages to be appreciated by studying the detailed explanation of the invention to be given hereafter may be attained by an apparatus for measuring the level and amount of a liquid stored in a tank characterized by comprising a pair of electrodes having a number of lengthwise segmented electrodes and an elongated outer electrode opposite to the segmented electrodes to form the corresponding number of capacitors, a high frequency electric source to apply voltage of high frequency to the segmented electrodes one by one to generate electrical signals each being a parameter of electrostatic capacity of each of the number of capacitors, means for converting the signals to corresponding frequency signals, means for detecting a segmented electrode where the liquid level lies, means for computing the height of the liquid level from the height of the segmented electrode at the lower edge thereof and frequencies of the signals, means for computing the liquid quantity from the level height, and means for displaying the computed results.

The objects and advantages may be attained further by the apparatus as mentioned above further characterized by comprising a capacitor probe which is prepared by fastening an elongated flexible and insulative substrate printed with the segmented electrodes and concerned wirings around a rigid bar of a length is adjusted by cutting or adding so as to conform to the tank depth, covering the outer surface of the printed substrate with insulative material and fitting a metallic cylinder as the outer electrode therearound.

The objects and advantages may fully be attained by the apparatus as mentioned above further characterized in that the segmented electrodes are arranged in two rows in the longitudinal direction of the capacitor probe in such a zigzagged way that every opposite electrode is partly overlapped with the other.

A better understanding of the invention will be obtained from the detailed description to be made hereafter and the accompanying drawings illustrating embodiments of the invention.

DESCRIPTION OF THE EMBODIMENT

Figure 6:
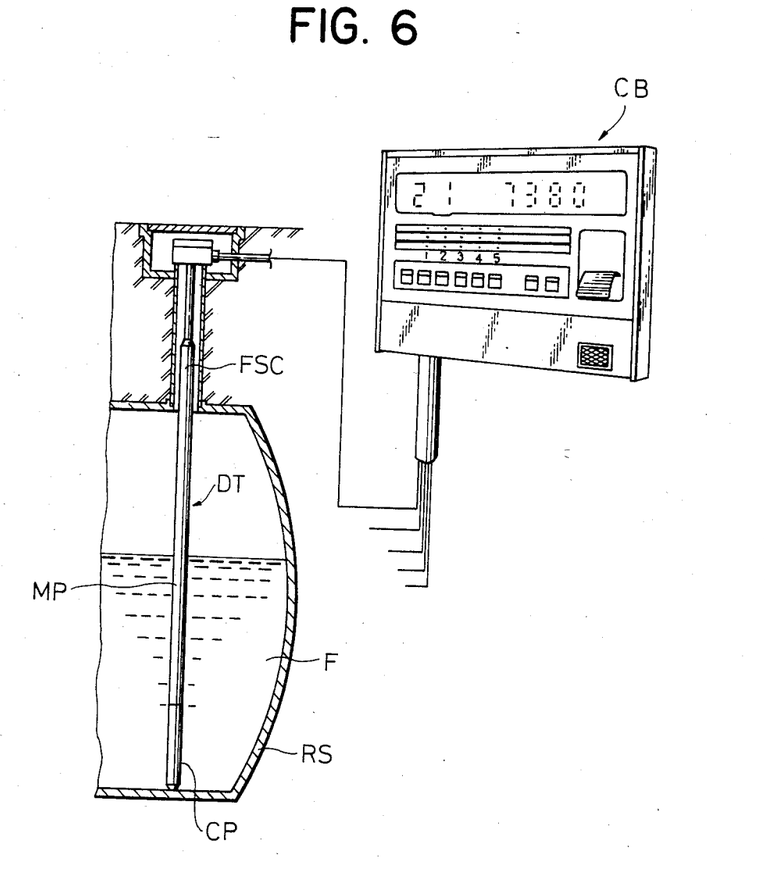
FIG. 6 is a schematic view giving a general idea of how the capacitor probe is provided in the underground tank.

In FIG. 6 there is shown an underground tank RS containing a liquid such as fuel F and a capacitor probe DT extending from the base of the tank RS to the top thereof as well as a control box CB located in a place remote more or less from the tank RS such as a gas station cabin. The probe has a probe portion CP for detecting the level of water accumulated over a long time on the tank bottom and beneath the fuel such as gasoline and another probe portion MP for detecting the level of gasoline, as well as means FSC for converting electric signals given from said probes respectively as parameters of electrostatic capacities of the probe levels where segmented electrodes are exposed to water, gasoline and gas to corresponding frequency signals, which are delivered to the gas station cabin where a computer to be operated by the control box analyzes the signals so as to detect water and gasoline levels and calculate the amount thereof. Means for operating the computer such as a key-board and indicators and the like are also provided therein, which may include the tank number, gasoline and water levels/quantities, audible and/or visible alarms for informing that the gasoline level is raised over or lowered below upper and lower predetermined limits and the water level is raised over a predetermined upper limit.

Figure 1A:
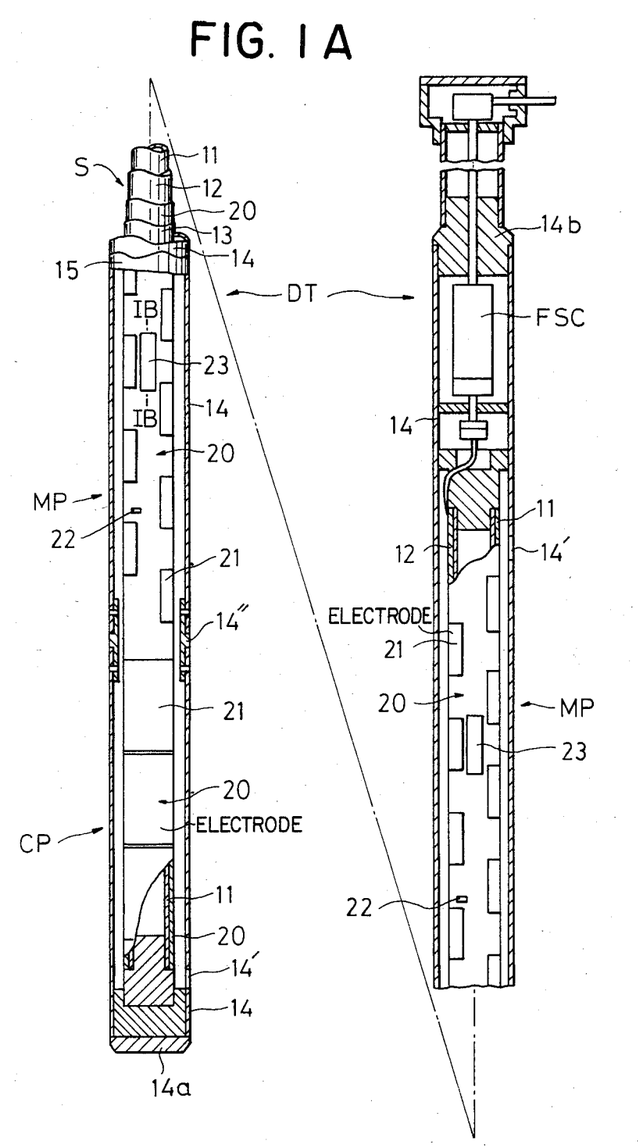
FIG. 1A is a longitudinal sectional view partly broken away and partly in section of a capacitor probe prepared according to the invention.

In FIG. 1A, there is shown a rigid rod having a pipe made of e.g. stainless steel 11 and a cover of insulative material 12 surrounding the pipe 11, of which the length may be readily adjusted by cutting or adding the necessary length of similar rod so as to conform with the depth of the tank.

Figures 1B, 2A, 2B:
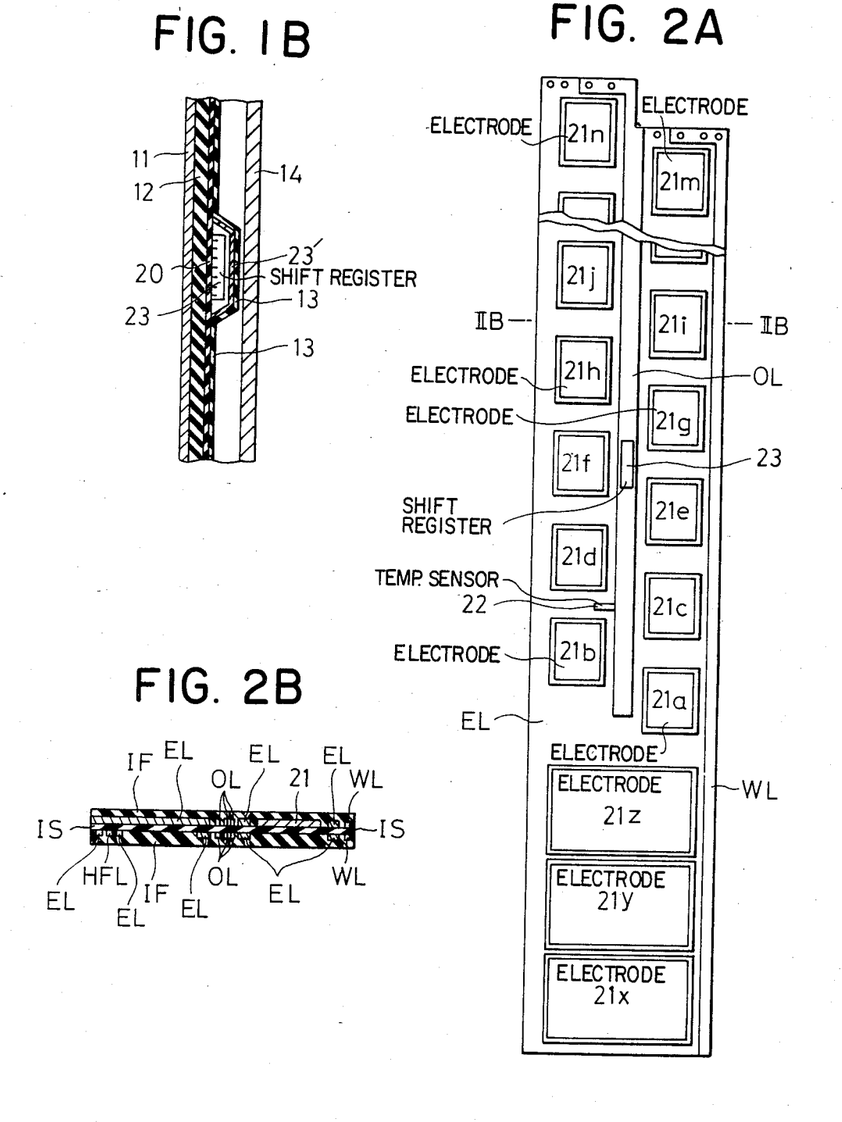
FIG. 1B is an enlarged section taken along the line IB—IB in said FIG. 1A.
FIG. 2A is a plan view partly cut away of the flexible substrate printed with the segmented electrodes for preparing the capacitor probe.
FIG. 2B is an enlarged sectional view taken along the line IIB—IIB in FIG. 2A with exaggerated thickness for the purpose of clearer illustration of the printed wiring arrangement.

A flexible and insulative substrate 20 on which a number of segmented electrodes, concerned wiring and other elements are printed, as explained later with reference to FIGS. 2A and 2B, is fastened around the rigid rod. The length of such printed substrate 20 may also be adjusted so as to conform with the depth of the tank.

The outer surface is covered with a film or sheet 13 of any material excellent in anti-chemicals, above all fuel oil resistance and having insulative properties such as ethylene fluoride resin (e.g. TEFLON by DuPont). When a tube made of such polymer having a diameter a little larger than the outer diameter of the rigid rod is fitted thereon and a heating tool having a ring is moved along said polymer tube, it is thermally shrunk to firmly hold the printed circuit on the rigid rod 11, 12.

A metallic pipe 14 as the other electrode is fitted on the assembly S of the inner segmented electrodes. The outer surface of electrode 14 is preferably covered with an insulative material such as polyester (e.g. TETORON by Toray). The outer electrode 14 is formed with a plurality of holes 14' along the length thereof with a suitable space between every adjacent two so that liquid and gas in the tank may have free access to an annular space formed between the outer and inner electrodes 14, 20 through the holes 14'.

On the substrate 20, there are arranged not only a number of segmented electrodes 21 but also several temperature sensor diodes 22, shift register (integrated circuits—IC's) and the like.

The outer electrode 14 must be divided into two, one for the first liquid (gasoline) capacitor probe portion MP and the other for the second liquid (water) capacitor probe portion CP. Between the divided probe portions MP and CP, a coupling 14" of high mechanical strength and insulative property, such as polyacetal (e.g. DELRIN by DuPont) is provided to integrally combine the two members.

The assembled probe DT has a shoe 14a made preferably of polyacetal at the lower end thereof which is attached on the tank base, and the upper portion thereof is filled with a block 14b preferably of polyacetal so as to tightly seal a chamber containing the converter FSC and firmly define an upper casing while electrically insulating it from the outer electrode 14.

FIG. 1B shows a shift register 23 provided on the printed substrate 20. This shift register 23 is covered with a metallic collar 23' in order to mechanically protect the shift register and eliminate electric noise. Numerical figures 11, 12, 13 and 14 respectively represents the stainless steel pipe, insulative cover, insulative cover made of thermally shrinkable polymer and the outer electrode referred to above.

FIGS. 2A and 2B illustrate the printed substrate 20. An elongated substrate IS made of a flexible and insulative material is printed with segmented assembly 21 that includes electrodes $21x$, $21y$ and $21z$ for detecting the water level and a number of segmented electrodes $21a$-$21j$ ... $21m$ and $21n$ for detecting the gasoline level. The electrodes $21a$-$21n$ are arranged longitudinally in two rows in a zig-zagged way so that every opposite electrode is partly overlapped, by the reasons referred to at the beginning of the specification. Since when the number of the segments is large the lead wire number is correspondingly increased, it is preferably to arrange several shift registers 23 so that each may control several, e.g. eight electrodes. In such case, high frequency voltage is applied through the respective shift register 23 to the segmented electrodes one by one preferably from the lowest electrode $21a$ to the top electrode $21n$. Electrical signals generated and taken out of the outer electrode 14, which is current of varied quantity depending on the medium presenting therebetween, is sent to the converter FSC at the top of the probe.

As seen from FIG. 2B, a section taken along a line IIB—IIB in FIG. 2A, it is preferable to print a lead wire HFL for applying high frequency voltage at the reverse side of the substrate IS in order to eliminate undesirable influences or the signals to be generated. For the same reason it is preferable to print earth wirings around every electrode. An upper and lower layers IF of insulative material are laminated on the printed substrate 20. In FIG. 2B, oil measurement lines connected to the segmented electrodes $21a$-$21n$ are indicated at OL, measurement lines connected to the segmented electrodes $21x$-$21z$ are indicated at WL, and earth lines which act to check incoming disturbances are indicated at EL.

When the length of such flexible printed substrate 20 is longer than the tank depth, it is easy to cut off the corresponding upper portion. If the length is shorter, it is easy to connect a suitable length of another printed substrate in the region of the segmented electrodes for gasoline level detection mechanically and electrically with the full length of the elongated substrate 20 so as to comply with the tank depth. The flexible substrate 20 of which length has been adjusted is fastened round the rigid rod 11, 12 and tightly covered with a thermally shrinkable polymer sheet to readily form the elongated inner electrode assembly S.

Figure 3:
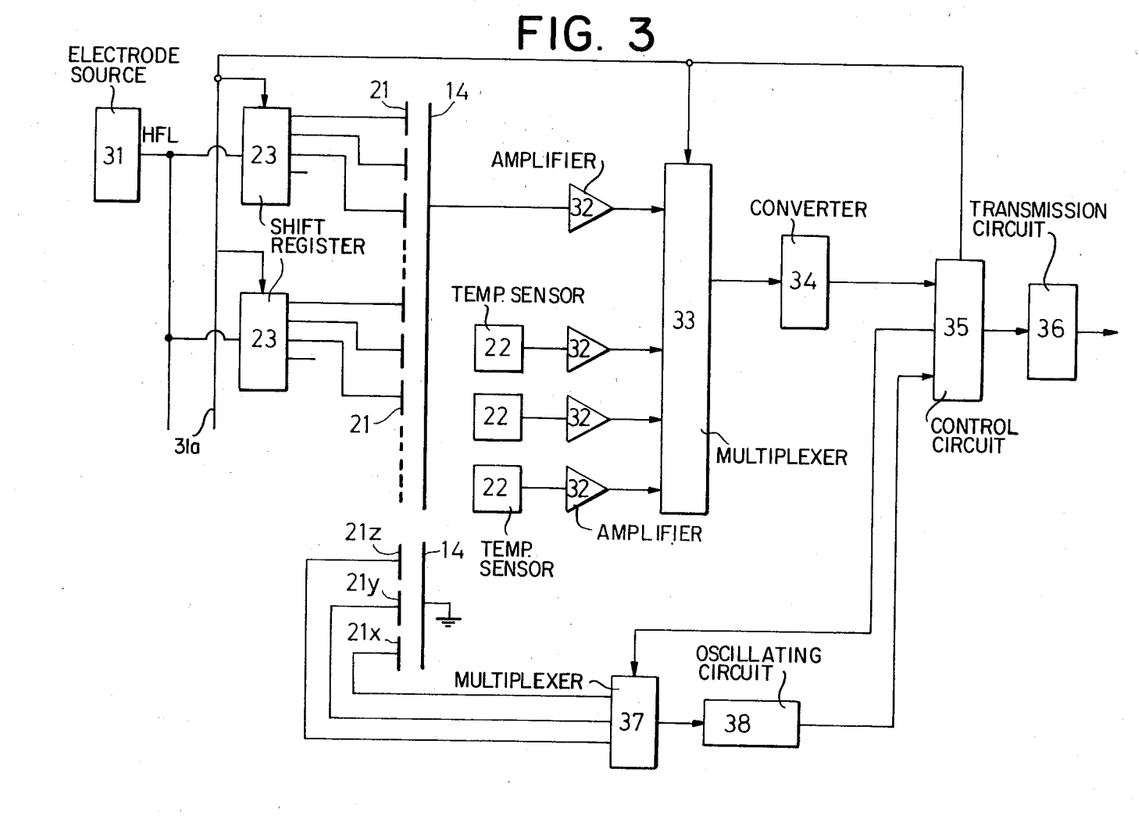
FIG. 3 is a block diagram showing how an electric signal is taken out and converted to a frequency signal as a parameter of the electrostatic capacity of the capacitor probe together with other concerned signals.

Now with reference to FIG. 3, in which a clock source is indicated at 31a the segmented electrodes 21 for the first liquid (gasoline) are connected in an indicating circuit means through shift registers 23 with a high frequency electric source HFL 31, from which 1 V voltage with 25 kHz is applied to the segmented electrodes 21 one. The electrical quantity flowing between the opposite electrodes 14, 21 is varied depending on whether there is vapor or gasoline therebetween the corresponding dielectric constant thereof. This current signal or converted voltage signal is inputted together with the electric signal from the temperature sensor 22 to means 34 for converting them to a corresponding height frequency signal through amplifying means 32 and a multiplexer 33. If the input signal is of voltage nature, the converting means 34 may be a V/F converter. The output signal therefrom is inputted to a receiving circuit 41 of FIG. 4 through a control circuit 35 and a transmission circuit 36.

Figure 4:
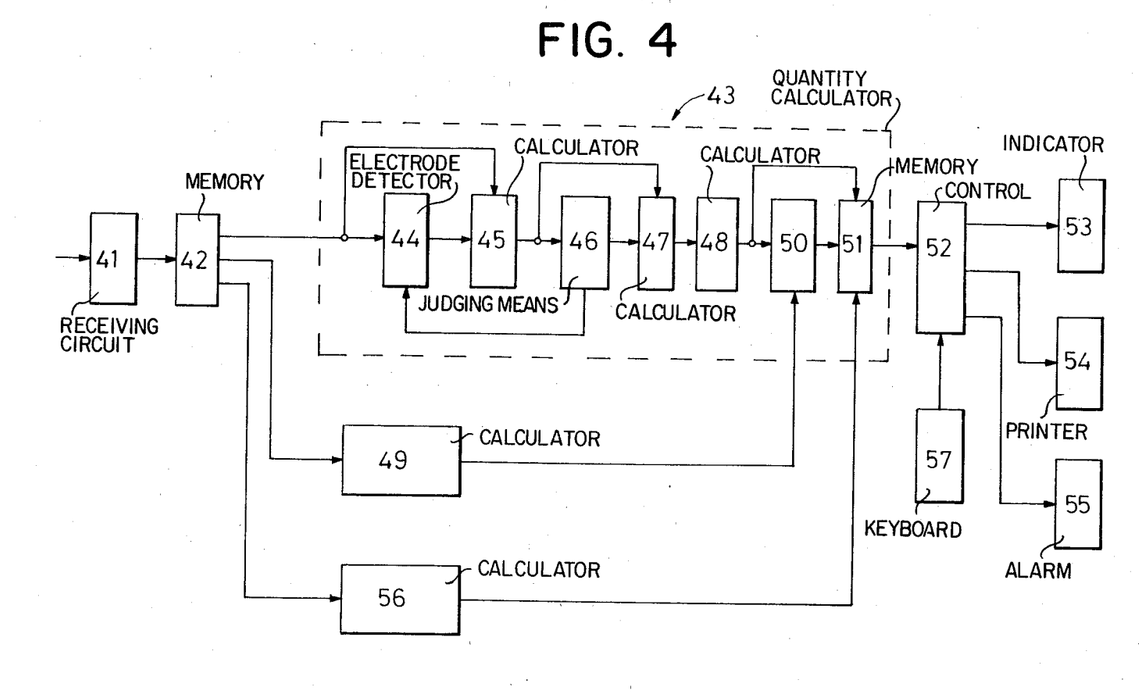
FIG. 4 is a block diagram showing how the input frequency signals are treated by the computer for determining the liquid level and quantity.

The electrical signal from the segmented electrodes 21x, 21y and 21z is inputted to the receiving circuit 41 through another multiplexer 37, RC oscillating circuit 38 in which a capacitor is formed between the opposite electrodes, the control circuit 35 and transmission circuit 36.

Further with reference to FIG. 4, successive signals inputted to the receiving circuit 41 are stored in temporary memory means 42 and inputted to means 43 for calculating the gasoline quantity which is enclosed by phantom lines in the drawing. In the gasoline quantity calculating means 43, firstly a segmented electrode detecting means 44 identifies the segmented electrode not fully exposed to gas or gasoline but partly the dipped in gasoline. Then the height of dipped portion of the detected segment is calculated by a dipped height calculating means 45.

According to the judging means 46, it is decided whether or not the inputted result from calculating means 45 can be used as the basis for proper calculation of the dip height. When the conclusion is NO, the prior stage repeats the calculation with respect to the upper or lower segmented electrodes. When such conclusion is YES, the information on the dipped height of the segmented electrode is given to liquid level height calculating means 47 so as to bring the level height value by adding the dipped height to the height of the electrode at the base thereof from the tank bottom.

This datum on the liquid level is inputted to a liquid quantity calculating means 48 so as to geometrically calculate the quantity value while taking into consideration known data on the dimensions and configuration of the tank.

Since the liquid quantity is varied depending on the temperature thereof, the calculated quantity must be compensated with information on temperature in the form of a frequency signal given by the sensor 22 as referred to above to be that of the standard quantity at 15° C. The temperature signal stored in the temporary memory means 42 is taken out to be treated by a temperature calculation means 49. The output therefrom is sent to a temperature compensation means 50 so as to compensate the liquid quantity information inputted thereto.

The compensated quantity of gasoline is stored in memory means 51 together with the uncompensated quantity and indicated on an indicator means 53 through control means 52 and printed out as occasion demands from printer means 54. When the result is above the preset upper limit or below the preset lower limit, visible and/or audible alarm means 55 is energized to inform occurence of exceptional circumstance.

A frequency signal on the level of water accumulated on the tank bottom and under the gasoline is received by the receiving circuit 41 to be inputted to second liquid level/amount calculating means 56 via the temporary memory means 42. The calculated result is stored in the memory means 51 and outputted from the indicator means 53 and printer means 54 via the control circuit 52. If the result is beyond the preset value, the alarm means 55 is similarly energized. What is represented by 57 is a key-board for operating a computer.

Figure 5:
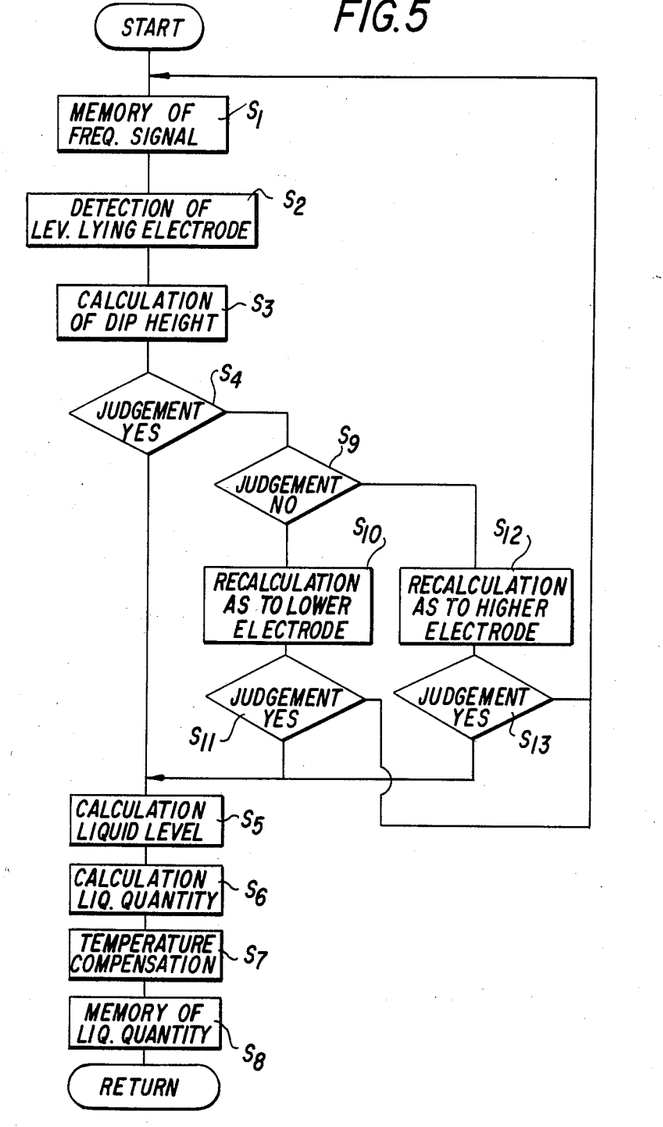
FIG. 5 is a flow chart of the treatments referred to above.

Now in reference to FIG. 5 while taking into consideration also FIG. 4, operation of received signals will more definitely be explained.

When the liquid quantity measuring operation is started, high frequency voltage is applied from the electric source to the many segmented electrodes one by one so as to generate corresponding frequency signals one by one.

Supposing that the signal as to the segmented electrodes fully dipped in gasoline and fully exposed to gas are respectively of frequencies 80 kHz and 40 kHz, the signal from the segmented electrode on which the liquid level lies is to be of a frequency therebetween which may be for instance 41 kHz, 60 kHz or 79 kHz. In general it is preferable to apply voltage to the segments from the bottom upwards, but an explanation shall be made firstly on the gasoline level detection.

Starting from the lowest electrode 21a (FIG. 2A), frequencies of the signals received one by one are for instance 80(a), 80(b), 80(c), 50(d), 40(e), 40(f), 40(g) . . . kHz. The data on such frequency signals are temporarily stored (Step $S_1$) in the memory means 42 and detection of the segmented electrode where the gasoline level lies is commenced (Step $S_2$) by the means 44, which is made by comparison of the frequencies of every adjacent two electrodes where a, b, c, d, e, f, g . . . each represent the respective frequency of the capacitors of the various electrodes 21(a), 21(b), 21(c), 21(d), 21(e), 21(f), 21(g) . . . . From the remainders a−b=0, b−c=0, c−d=30, d−e=10, e−f=0, f−g=0 . . . , it can be found that the electrode 21d is partly dipped in gasoline. Supposing that the height L of the segmented electrode in the probe longitudinal direction is 29 mm, how much mm (X mm) of the electrode is dipped in gasoline (dipped height) is calculated (Step $S_3$) by the means 45. When the frequencies of the signals from the adjacent two electrodes 21b and 21f to the electrode 21d in the same row are (b) kHz and (f) kHz;

$$x \text{ (mm)} = \frac{d-f}{\left(\frac{b-f}{L}\right)} = \frac{50-40}{\left(\frac{80-40}{29}\right)} = 7.25 \text{ (mm)}$$

When the opposite two segments are overlapped by OV (mm), the proper calculation can not be expected if $x<OV/2$ or $x>L-OV/2$. Since in this embodiment the OV is 4 mm so that said x (mm), 7.25 mm is not smaller than $OV/2=2$ mm and not larger than $L-OV/2=27$ mm, it is judged that said 7.25 mm may be used for a proper calculation (Step $S_4$) by the means 46. If the height S (mm) of the lowest electrode 21a at the base thereof from the tank bottom is 200 mm, the height of the electrode 21d, the fourth from the lowest electrode is $S+(4-1)(L-OV)=200+3(29-4)=275$ mm, to which the $x=7.25$ mm is added to bring the result of 282.25 mm as the gasoline level height (Step $S_5$) by the calculating means 47.

If it is judged that the dipped height can not be used for proper calculation of the liquid level height in the means 46 (Step $S_9$), the calculation and judgement are to be repeated as to the upper and lower electrodes in the same row (Steps $S_{10}$ and $S_{11}$) (Steps $S_{12}$ and $S_{13}$).

As mentioned above, then the information on the level height judged to be proper is used for calculation of the liquid quantity (Step $S_6$), which must be compensated as to the temperature in the means 48. When the frequencies of the temperature signals are 35 kHz (15° C.), 49 kHz (20° C.) and 63 kHz (25° C.), it is possible to analyze the received signal frequency to know the temperature of gasoline of which quality is calculated and make the necessary temperature compensation in the means 50 (Step $S_7$).

The compensated quality of gasoline is stored in the memory 51 (Step $S_8$) and outputted at the indicator and the printer.

The calculation of the water level height is far easier than that of gasoline since the segmented electrodes are arranged in one row and there will be no need for further explanation thereon.

What is claimed is:

1. Apparatus for measuring the level and amount of at least one liquid in a tank comprising an electrode probe having a pair of electrode means, one of said electrode means comprising two rows of spaced segmented electrodes with the segmented electrodes in one row being longitudinally offset relative to the segmented electrodes in the other row to provide an overlapping relationship between the segmented electrodes in the two rows, the other of said electrode means comprising an elongated electrode disposed in opposing relationship to said segmented electrodes to form a corresponding number of capacitors, means for supplying a voltage of high frequency to said segmented electrodes and said elongated electrode to generate electrical signals corresponding to the electrostatic capacity of each of said capacitors, converting means for converting said electrostatic capacity into a frequency signal, comparing means for comparing the signal frequency of said capacitors formed by said segmented electrodes to thereby detect where the liquid level lies on the segmented electrodes, and calculating means for calculating the quantity of liquid in said tank based on said detected liquid level.

2. Apparatus according to claim 1, wherein said comparing means compares the signal frequencies of every two adjacent segmented electrodes in each of said rows.

3. Apparatus according to claim 2, wherein said calculating means is operable to determine if the liquid level height x in feet of the detected liquid level relative to the bottom edge of each segmented electrode meets the following conditions:

$x<OV/2$ $x>L-OV/2$ where OV is the amount in inches of overlap of the segmented electrodes in the two rows and L is the longitudinal length of the segmented electrodes such that under the condition that x is not less than OV/2 and not greater than $L-OV/2$, said calculating means is operable to use the signals from the capacitor of the segmented electrode meeting said conditions for measuring the liquid level in said tank.

4. Apparatus according to claim 3, wherein said calculating means is operable to reject the signals produced by the capacitor of the segmented electrode not meeting said conditions and use the signals from the next higher or lower capacitor of the segmented electrode which does meet said conditions.

5. Apparatus according to claim 1, wherein said calculating means is operable to calculate the height of the liquid level of one segmented electrode by comparing the frequency of the capacitor using said one electrode with the frequency of the capacitors using the segmented electrodes on either side of said one segmented electrode in the same row.

6. Apparatus according to claim 1 further comprising compensating means on said electrode probe producing a temperature compensation signal related to the temperature of the liquid in said tank, said compensating means being operable with said calculating means for compensating the amount of calculated liquid in said tank depending on the temperature of said liquid.

7. Apparatus according to claim 6, wherein said calculating means comprises detecting means providing a detecting signal related to the level of liquid in said tank, amplifying means for amplifying said detecting signal, amplifying means for amplifying said temperature compensation signal, and a multiplexer connected to each of said amplifying means for converting said detecting signal and said temperature compensation signal to frequency signals.

8. Apparatus according to claim 1 further comprising lower segmented electrodes on said electrode probe below the first said segmented electrodes, and operable means operably connected to said lower segmented electrodes for measuring the level of a separated liquid accumulcated at the bottom of said tank, said separated liquid being different from the first said liquid.

9. Apparatus according to claim 8, wherein said operable means comprises oscillating means for converting electrical signals from the capacitors formed by said lower electrodes and said other electrodes to frequency signals.

10. An electrode probe for use in liquid level and quantity measuring apparatus comprising a cylindrical outer electrode made of electrically conductive material, and an inner electrode assembly inserted in the outer electrode with a gap between said inner electrode assembly and said outer electrode in which the liquid can flow in and out, said inner electrode assembly comprising a pipe means which includes a pipe and a layer of insulating material disposed on the outer periphery of said pipe, a flexible substrate disposed about said pipe means, an insulating film disposed about said flexible substrate for holding said flexible substrate on said pipe means, and printed segmential electrodes carrying at least one indicating circuit element, said electrodes being printed on said flexible substrate in a preselected arrangement such that said printed segmented electrodes and said outer electrode form a plurality of capacitors for use in conjunction with the indicating circuit element in determining the liquid level of at least one liquid in which the probe is disposed.

11. An electrode probe according to claim 10, wherein said printed segmented electrodes comprises a first plurality of segmented electrodes for measuring the level of one liquid, and a second plurality of segmented electrodes for measuring the level of another different liquid, said electrode probe being elongated and generally vertically disposed, said second plurality of segmented electrodes being disposed below said first plurality of segmented electrodes.

12. An electrode probe according to claim 11, wherein said first plurality of segmented electrodes measure the level of liquid fuel and said second plurality of electrodes measure the level of water below said liquid fuel.

13. An electrode probe according to claim 11, wherein said first plurality of segmented electrodes comprises two rows of spaced segmented electrodes with the segmented electrodes in one row being longitudinally offset relative to the segmented electrodes of the other row to provide an overlapping relationship between the segmented electrodes in the two rows, said second plurality of segmented electrodes being disposed in a single row.

14. An electrode probe according to claim 10, wherein said pipe is made of stainless steel.

15. An electrode probe according to claim 10, wherein said insulating film comprises heat-shrinkable tubing.

16. An electrode probe according to claim 10, wherein the electrode probe is used for measuring the level of liquid fuel, said insulating film being made of a material which resists deterioration from said liquid fuel.

17. An electrode probe according to claim 16, further comprising an outer insulating tubing disposed about the outer periphery of said outer electrode, said outer insulating tubing being a heat shrinkable tube and being made of a material which resists deterioration from said liquid fuel.

18. An electrode probe according to claim 10, wherein the electrode probe is elongated and has a longitudinal axis, said segmented electrodes being disposed in two rows generally parallel to said longitudinal axis, the segmented electrodes in each row being spaced from one another, the segmented electrodes in one row being longitudinally offset from the segmented electrodes in the other row such that the segmented electrodes in each row overlap the space between the segmented electrodes in the other row.

19. An electrode probe according to claim 10, further comprising a plurality of shift registers on said flexible substrate, each of said shift registers controlling a different group of segmented electrodes, a plurality of temperature sensor diodes on said flexible substrate, and a plurality of printed lead wire means printed on said flexible substrate and extending between said shift registers and said segmented electrodes for applying high frequency voltage across the segmented electrodes via each of said shaft registers.

20. An electrode probe according to claim 19 further comprising earth wires printed on said flexible substrate about said segmented electrodes and along said printed lead wire means.

* * * * *